Dec. 30, 1969   J. G. FONTAINE   3,487,451
BRAKE CONTROL MEANS FOR VEHICLES
Filed March 6, 1968   4 Sheets-Sheet 1

INVENTOR.
JOHN G. FONTAINE
BY
James N. Giles
ATTORNEY

Dec. 30, 1969  J. G. FONTAINE  3,487,451

BRAKE CONTROL MEANS FOR VEHICLES

Filed March 6, 1968  4 Sheets-Sheet 2

INVENTOR.
JOHN G. FONTAINE
BY
ATTORNEY

Dec. 30, 1969        J. G. FONTAINE        3,487,451
BRAKE CONTROL MEANS FOR VEHICLES
Filed March 6, 1968        4 Sheets-Sheet 3

INVENTOR.
JOHN G. FONTAINE.
BY James N. Lyles
John H. Oltman
ATT'YS

Dec. 30, 1969    J. G. FONTAINE    3,487,451
BRAKE CONTROL MEANS FOR VEHICLES
Filed March 6, 1968    4 Sheets-Sheet 4

INVENTOR.
JOHN G. FONTAINE.
BY *James N. Tyler*
*John H. Oltman*
ATT'YS

United States Patent Office 3,487,451
Patented Dec. 30, 1969

3,487,451
BRAKE CONTROL MEANS FOR VEHICLES
John G. Fontaine, 500 NE. 35th St.,
Fort Lauderdale, Fla. 33308
Continuation-in-part of application Ser. No. 537,491,
Mar. 25, 1966. This application Mar. 6, 1968, Ser.
No. 716,255
Int. Cl. B60t 7/14; F16d 65/14; H0h 3/02
U.S. Cl. 303—19                        10 Claims

ABSTRACT OF THE DISCLOSURE

A brake control system or mechanism for operating the brakes of a vehicle in response to actuation of a pressure-switch in the driver's seat of the vehicle when the driver leaves the seat. The brakes may be air operated, hydraulically operated, spring operated or other type, and the brake control system may operate by air pressure, release of air pressure, or vacuum by way of example. The switch in the seat includes an apertured cushion with multiple contact elements on opposite sides of the cushion. The cushion is compressed when the driver sits on the seat, and contacts close through the apertures of the cushion. When the driver leaves the seat, the cushion expands and the contacts open to apply the brakes. By having multiple contacts spread over an area of the seat, it is assured that at least one pair of contacts will close when the driver is seated, even if he should move around or lean over.

BACKGROUND OF THE INVENTION

This application is a continuation-in-part of copending application Ser. No. 537,491, filed Mar. 25, 1966, (now abandoned) by the present inventor.

This invention relates to brake controlling mechanism for use in connection with the brake systems of land vehicles, such as passenger buses or the like, and has particular reference to automatic control means for the brakes of the vehicle that is actuated by a pressure controlled switch within the seat structure normally occupied by the driver of the vehicle.

Brake systems of automotive vehicles are normally liquid or air operated both front and rear, controllable by the foot of the operator. There may also be a parking brake which is usually controllable by hand. There are times when the driver of the vehicle leaves the driver's seat without applying either the foot brake or the hand brake when it would be desirable to have the brakes applied automatically. Although it has been proposed to provide a control system for applying the brakes of a vehicle when the driver leaves the driver's seat, known systems have not been sufficiently safe, dependable and trouble free to make them practical for commercial use. By way of example, it has been suggested that a switch with a spring biased actuator be placed under a driver's seat which is pivotally mounted so that when the driver is seated, the switch is actuated to keep the brakes off, and when the driver leaves the seat, the switch is released to apply the brakes. One problem is that movements of the driver while still seated may release the switch momentarily causing the grabbing of the brakes. This may lead drivers to jamb the switch closed, and this can be done easily since the switch has been accessible under the driver's seat.

SUMMARY OF THE INVENTION

The invention includes a pressure actuated switch mechanism within the seat construction of a vehicle that is normally closed when the weight of the driver is disposed upon the seat. The pressure actuated switch is connected in control means for the brakes of the vehicle, and when the driver leaves the seat, the switch opens to actuate the control means which in turn applies the brakes of the vehicle. One embodiment of the switch comprises a central cushion that is apertured to permit the passage of contact elements from contact sheets of foraminous material that are disposed upon the upper and lower sides of the cushion. Each of the foraminous sheets is of metallic material and has contact elements over its surface corresponding to the apertures of the cushion. The several elements are disposed within a casing and at least one of the contact elements of each of the foraminous sheets is electrically connected to the control means so that, when the driver is incapacitated or removed from the seat, the contact elements will be spaced apart and, when the driver is disposed upon the seat, the contacts close through the apertures of the cushion. Closing of the contacts keeps the brakes off and opening of the contacts applies the brakes. By employing multiple contacts spaced over a substantial area of the seat, at least one pair of contacts will be closed even if the driver shifts or leans over, there will be no grabbing of the brakes prematurely.

Novel features of the construction and operation of the device will be more clearly apparent during the course of the following description, reference being had to the accompanying drawings wherein has been illustrated a preferred form of the device and wherein like characters of reference are employed to denote like parts throughout the several figures.

Figure 1:
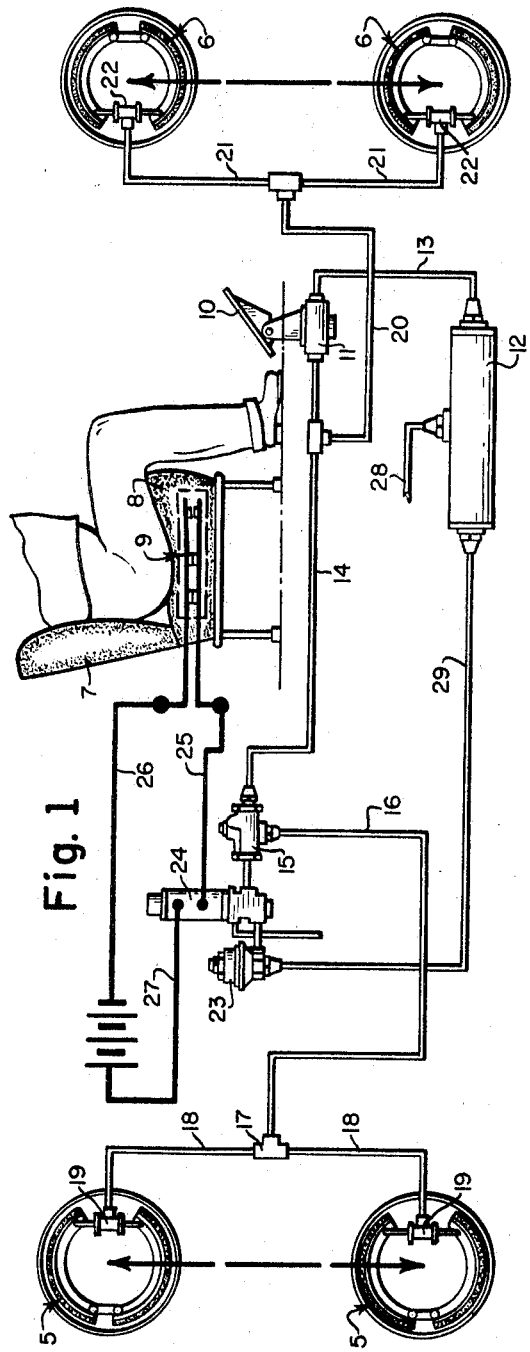
FIGURE 1 is a diagrammatic illustration of a brake control mechanism for the several wheel brakes, showing the establishment of a circuitry to the brake controlling mechanism.
Figure 2:
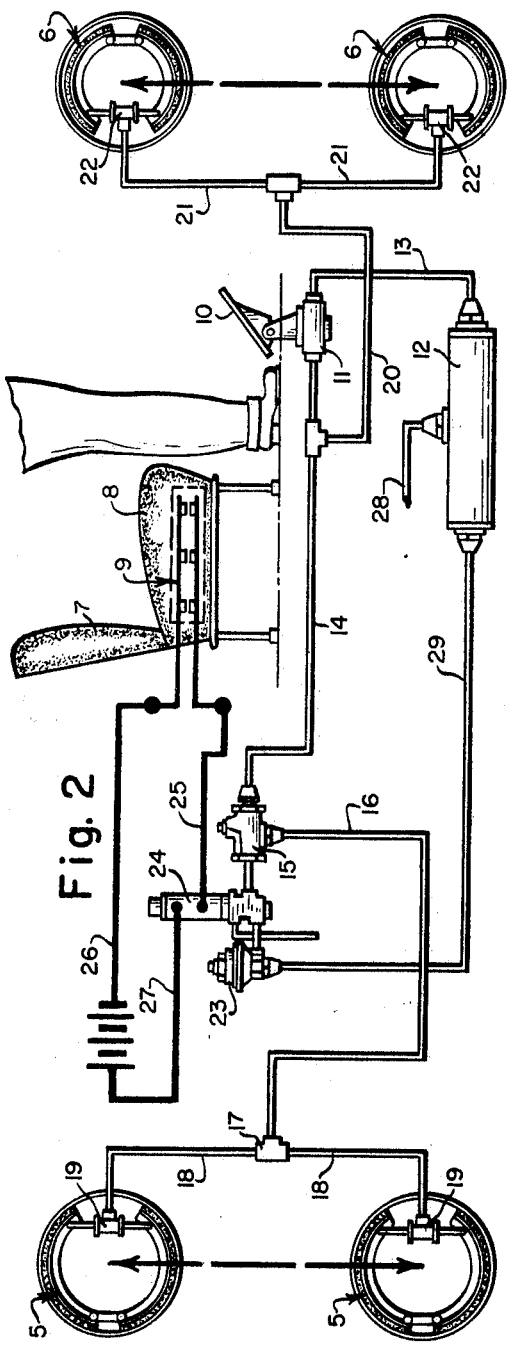
FIGURE 2 is a view similar to FIGURE 1 but with the driver removed from the seat and causing the circuitry to be interrupted.
Figure 3:
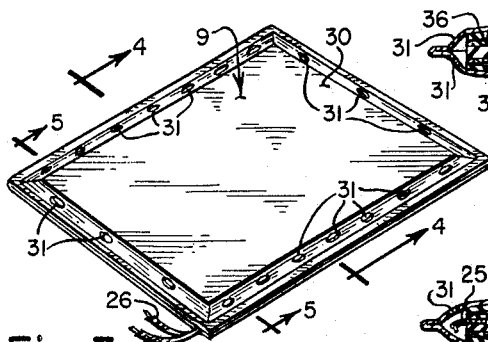
FIGURE 3 is a perspective view of a seat pressure actuated switch mechanism.

Referring specifically to the drawings and particularly to FIGURES 1 and 2, there has been illustrated rear brakes 5 and front brakes 6. A driver's seat 7 includes a cushion seat element 8 into which is fitted a switch device, illustrated as a whole by the numeral 9. The floor of the vehicle carries a brake control pedal 10 that functions to actuate the several brakes by foot valve 11, having connection at one end to an air supply tank 12, through the medium of a conduit 13. The valve 11 is connected by a conduit 14 to a check valve 15 and the check valve 15 is connected to the rear brakes by conduit 16 that leads to a coupling 17 and lateral conduits 18 are connected to brake cylinders 19. The valve 11 is also connected to the front brakes 6 by conduit 20, coupled into the conduit 14 and leading to lateral conduits 21 that are connected to brake cylinders 22 of the front brakes 6. The opposite end of the air supply tank 12 is connected to a regulator valve 23 and a magnetic valve 24 is connected to the check valve 15 and the regulator 23. One element of the switch 9 is electrically connected to the magnetic valve 24 by a conductor 25, while the other element of the switch 9 is connected to a source of electrical energy a conductor 26 and the opposite side of the source of electricity is connected to the magnetic valve 24 by a conductor 27. Air to the tank 12 is supplied through a conventional compressor, forcing air through a conduit 28.

The magnetic valve 24 is of the type having a gate which is normally open and which closes when the energizing circuit for the valve is completed. When the driver is seated on seat 8, the switch 9 is closed, and this completes the energizing circuit so that valve 24 is closed. Thus, no air can flow from tank 12 through line 29 past valve 24.

The brakes can be applied by the driver by depressing foot pedal 10. This opens valve 11 so that air under pressure flows from tank 12 through conduits 13, 20 and 21 to cylinders 22 which apply the front brakes 6. Air also flows from tank 12 through conduits 13 and 14 to check valve 15. Valve 15 has a shuttle therein which is pushed to the left in FIG. 1 to close the passage communicating with valve 24 so that air is blocked in this direction. However, the shuttle opens the passage connected to line 14, so air flows through valve 15, and conduits 16 and 18 to cylinders 19 which apply the rear brakes 5. When the foot pedal is released, air is exhausted from the conduits 14, 16, 18, 20 and 21 through an exhaust 4 in valve 11.

If the driver should leave the seat 8 for any reason, switch 9 opens to break the energizing circuit. Valve 24 is deenergized to its open condition. Air pressure from tank 12 is then applied through conduit 29, regulator 23 and valve 24 to check valve 15. The pressure pushes the shuttle in valve 15 to the right as viewed in FIGURE 1 so that the shuttle closes the passage communicating with conduit 14 and air cannot flow in that direction. However, the passage communicating with valve 24 is opened so that air flows through valve 15 and conduits 16 and 18 to cylinders 19 which apply the rear brakes 5. Regulator 23 controls the pressure and is adjusted to assure that only enough pressure is applied to the rear brakes 5 to bring the vehicle to a safe stop. It would obviously be undesirable for the brakes to be applied hard enough to put the vehicle into a skid. When the driver again occupies the seat 8, switch 9 closes and valve 24 then also closes. Air is exhausted from lines 16 and 18 through an exhaust 3 in valve 24.

Referring now to FIGURES 3–7, there is shown an envelope of flexible material 30, the marginal edges of which are closed and sealed and with a multiplicity of apertures 31 disposed around the marginal edges of the envelope whereby to permit the envelope to breathe or expand under the influence of the inner mechanical devices. Disposed within the envelope is a central, relatively thick cushion pad 32, having a multiplicity of equidistantly spaced apertures 33 formed therein and upon the upper and lower faces of the cushion pad 32, there has been disposed foraminous metallic sheets 34. The sheets 34 are preferably formed of aluminum or other wire mesh and are provided with marginal tapes 35, to prevent fraying of the sheets. Upon the outer sides of each of the sheets 34, there is provided protective sheets 36 and the sheets 36 and the pad 32 are preferably formed of foam rubber or the like and the several sheets 32, 34 and 36 are fitted together in overlying relation, shown in FIG. 7 and the several sheets are bound together by bonding strips 37 so that a square pad is formed that has fitment into the envelope 30. The envelope of course is formed of flexible non-metallic material calculated to avoid the passage of moisture or to prevent short circuiting of the switch element. Each of the sheets 34 is provided with metallic eyelets or contacts 38 that are spaced apart in accordance with the spacing of the apertures 33 of the pad 32. At least one of the eyelets 38 on each sheet is soldered or otherwise connected to the conductors 25 and 26. All eyelets or contacts 38 on each sheet 34 are electrically common due to their connection to sheet 34.

Figure 4:
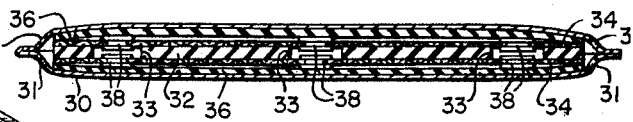
FIGURE 4 is a section taken substantially on line 4—4 of FIGURE 3.
Figure 5:
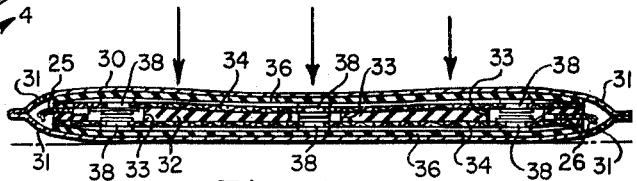
FIGURE 5 is a section taken substantially on line 5—5 of FIGURE 3.
Figure 6:
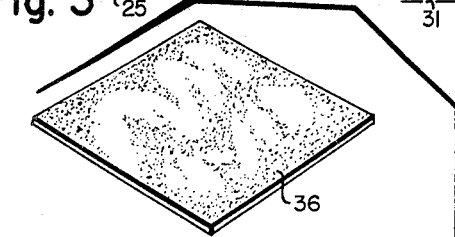
FIGURE 6 is an exploded perspective view of the several elements embodied within the switch mechanism of the seat.
Figure 6:
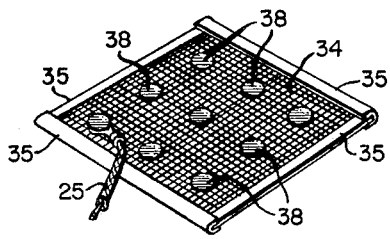
Figure 6:
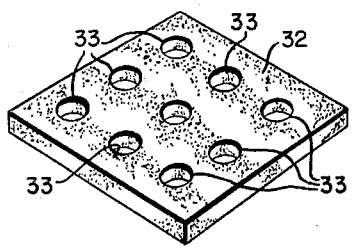
Figure 6:
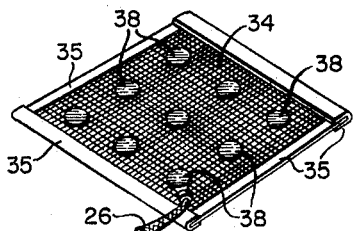
Figure 6:
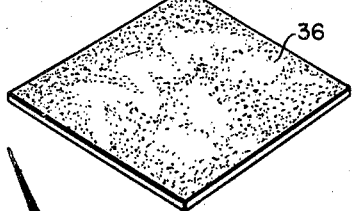
Figure 7:
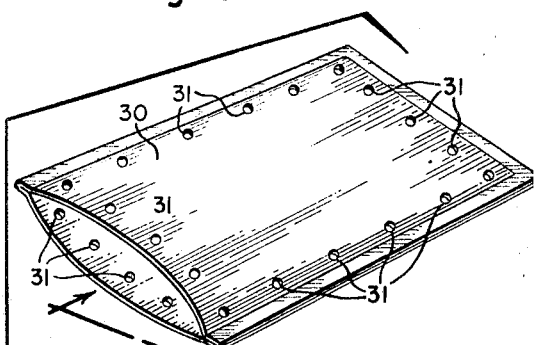
FIGURE 7 is a composite perspective view of the several elements of the seat switch and the enclosing seal thereover.
Figure 7:
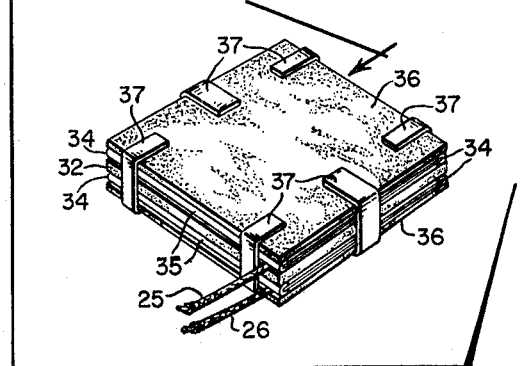

With the several elements 32, 34 and 36 stacked together as illustrated in FIGURE 7, it will be apparent, that with the weight of the driver disposed upon the seat 8, the switch pad 32 is compressed and with one or more of the eyelets 38 passing through the apertures 33 for contacting engagement, such as illustrated in FIGURE 5, establishing a flow of electrical energy from the battery to the magnetic valve 24 and for the actuating of the entire brake system of the vehicle, when the pedal 10 is depressed. When weight is removed from the seat 8, the sponge rubber pad 32 automatically expands, moving the contacts 38 apart, as illustrated in FIGURE 4, interrupting the circuit to the magnetic valve 24 and air will then flow back from the tank 12 to the regulator 23 and to the check valve 15, where the air will flow through the conduits 16, conduits 18 and to actuate the brake cylinders 19 of the rear brakes 5.

It may be noted that the switch unit is rather large in area and the contacts 38 are spread over a substantial area of the seat in which the switch unit is incorporated. As previously mentioned, this means that the driver can shift about while still seated or lean over without opening all of the contacts to apply the brakes. The contacts 38 on a given sheet are in parallel with each other, so all of them must be opened to apply the brakes. The mesh elements 34 are flexible so that they conform to the contour of the seat even after it has been used for a long time and becomes somewhat distorted. Because the elements 34 are open mesh, there is no resistance to air, so the switch unit can expand and contract easily.

Figure 8:
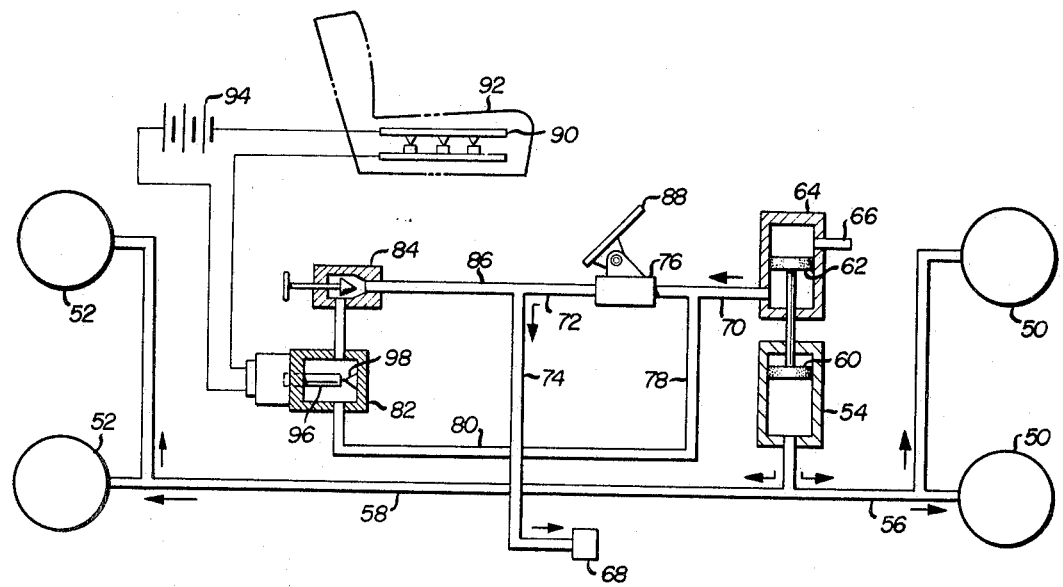
FIGURE 8 is a schematic diagram of another embodiment of a brake control system in which a combination of vacuum and hydraulic controls are operated by a seat pressure actuated switch.
Figure 9:
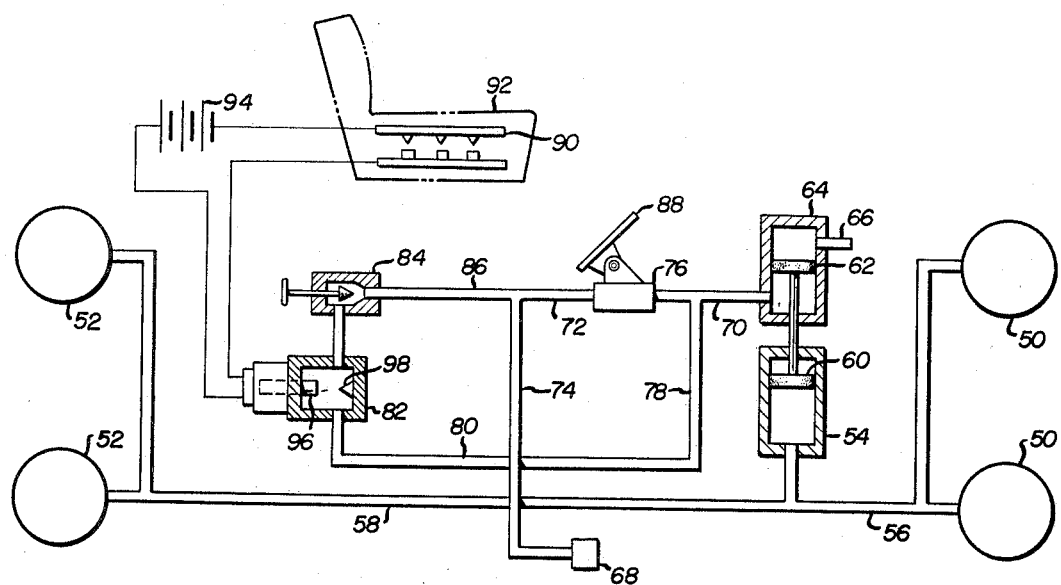
FIGURE 9 is a schematic diagram of the brake control system of FIGURE 8 in the condition where the brakes are applied when the driver leaves the seat of the vehicle.

FIGURES 8 and 9 are schematic diagrams of a braking system and a braking control system in which a combination of vacuum and hydraulic controls are operated by a seat pressure actuated switch. FIGURE 8 shows the systems in a condition where the brakes are being applied by a foot pedal for normal braking action, and FIGURE 9 shows the systems in the condition where the brakes are being operated by a seat switch illustrating an emergency action of the system. In FIGURES 8 and 9, there are front brakes 50 and rear brakes 52 for an automotive vehicle. All four brakes are connected to a master hydraulic cylinder 54, the front brakes being connected to the cylinder by conduit 56, and the rear brakes being connected to the cylinder by conduit 58. The piston 60 of cylinder 54 is connected to another piston 62 of a vacuum booster 64 such that movement of piston 62 is transmitted to piston 60. Vacuum booster 64 communicates with the atmosphere through an opening 66 above piston 62. Vacuum booster 64 communicates with a source of vacuum 68 via conduits 70, 72 and 74, there being a foot operated valve 76 in conduit 72. Vacuum booster 64 also communicates with vacuum source 68 via another path which includes conduits 70, 78 and 80, solenoid valve 82, needle valve 84, and conduits 86 and 74. Foot operated valve 76 is normally closed with the brake pedal 88 normally being in the position illustrated in FIGURE 8. Solenoid valve 82 is normally open, but is energized to a closed condition when the seat switch 90 is closed by the weight of the driver on the seat 92.

The seat switch 90 may be of the construction described in connection with FIGURES 3–7, and it is shown as being closed in FIGURE 8. Current flows from a battery 94 through seat switch 90 and solenoid valve 82 to energize the solenoid valve to a closed condition indicated by gate 96 abutting against stop 98 in FIG. 8.

For normal operation of the brake system and the control system, pedal 88 is depressed by foot pressure, thus opening valve 76. Vacuum from source 68 reduces the pressure under piston 62 of booster 64, and atmospheric pressure on the top of piston 62 forces it downwardly. The downward movement of piston 62 forces piston 60 of master cylinder 54 downwardly, and this pressurizes the hydraulic fluid in conduits 56 and 58 to actuate the front brakes 50 and the rear brakes 52.

FIGURE 9 illustrates the braking system and the braking control system in a condition of emergency operation. When the driver of the vehicle leaves seat 92 for any reason, seat switch 90 opens to interrupt current flow from battery 94 to solenoid valve 82. This deenergizes solenoid valve 82 resulting in retraction of the gate 96 which opens the solenoid valve. The pressure underneath piston 62 of vacuum booster 64 is reduced by vacuum applied from source 68 via conduits 70, 78 and 80, valves 82 and 84, and conduits 86 and 74. Piston 62 moves downwardly forcing piston 60 of master cylinder 54 downwardly to pressurize the fluid in conduits 56 and 58 and thus apply the front brakes 50 and the rear brakes 52.

Thus, the brakes may be hydraulically operated and the braking control system may be pneumatically operated.

Figure 10:
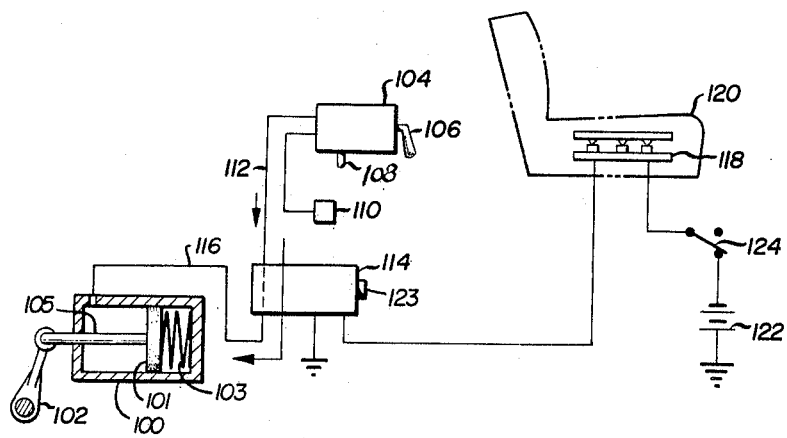
FIGURE 10 is a schematic diagram of still another embodiment of a brake control system in which spring brakes are operated by air which is exhausted when the driver leaves the seat of the vehicle.
Figure 11:
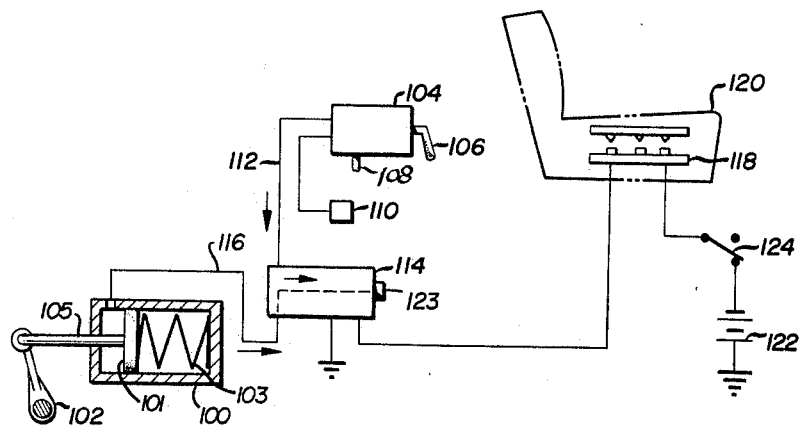
FIGURE 11 is a schematic diagram of the embodiment of FIGURE 10 in the condition where the brakes are applied by actuation of a seat switch when the driver leaves the seat of the vehicle.

FIGURES 10 and 11 illustrate a braking system and a brake control system in which the brakes are spring operated, and the controls are operated by release of air pressure, rather than application of air pressure. The brakes of a vehicle are controlled by a spring brake unit 100 controlling a lever 102 which applies and releases the brakes (not shown). FIGURE 10 shows lever 102 to the right of center indicating a position wherein the brakes are off, and FIGURE 11 shows the lever 102 in a position to the left of center indicating a position wherein the brakes are on. Brake unit 100 includes a piston 101 normally urged by a spring 103 to the position shown in FIGURE 11. However, when air under pressure is introduced into brake unit 100 via conduit 116 to the space behind piston 101, the piston 101 is moved to the right compressing spring 103. Rod 105 connected to piston 101 and lever 102 then pulls lever 102 to the position shown in FIGURE 10, thus releasing the brakes.

A manual control 104 is provided including a handle 106 of the push-pull type for actuating control 104. Control 104 may be used to provide parking brakes. Control 104 includes an exhaust 108 for releasing air pressure, and also receives air under pressure from an air supply 110. With the brakes off as in FIG. 10, handle 106 is in a position such that air under pressure is applied through control 104, conduit 112, magnetic valve 114 and conduit 116 to spring brake unit 100 such that the air pressure on piston 101 keeps the brakes off. If handle 106 actuated to connect conduit 112 to exhaust 108, air pressure is released from conduits 112 and 116 and exhausted via exhaust 108 so that piston 101 of spring brake unit 100 moves to the position shown in FIG. 11 and applies the brakes of the vehicle.

Magnetic valve 114 is normally closed, but is energized to an open position when pressure is applied to a seat switch 118 when the driver sits on seat 120. Current is then applied from battery 122 through ignition switch 124 and switch 118 to magnetic valve 114, one side of which is grounded as shown, to energize valve 114 to its open position as shown in FIG. 10. In this position, air under pressure is applied to brake unit 100 as previously explained to keep the brakes off. Valve 114 has an exhaust 123 which communicates with conduit 116 when valve 114 is closed. Thus, when the driver leaves seat 120 for any reason, seat switch 118 opens to interrupt the flow of current to valve 114, thus deenergizing that valve to its closed condition as shown in FIG. 11. In this condition, air is exhausted from brake unit 100 and conduit 116 via exhaust 123, and this release of air pressure allows spring 103 to push piston 101 and lever 102 to the left to apply the brakes.

In this embodiment, it may be seen that the ignition switch 124 is in series with seat switch 118. Therefore, if the ignition switch is open, the brakes will be applied in exactly the same manner as when seat switch 118 opens. If the driver then leaves seat 120 and takes the ignition key with him, it would be impossible for an unauthorized person, such as a child for instance, to cause the vehicle to run away if the child should occupy the driver's seat.

Thus, FIGURES 10 and 11 illustrate that the brakes may be of the spring brake type, and the control system may be operated by release of air pressure. Also, the seat operated controls may supplement a hand control normally used for parking brakes such as the control unit 104. It will be evident that other types of control systems may be used in combination with a seat pressure actuated switch.

The system illustrated is a safety system and is automatic in its use. The mechanism is quickly and easily fitted into a conventional vehicle, such as a bus, and functions, with the normal control mechanism within the conventional brake system to automatically establish the braking of the wheels. The device is simple in construction, has relatively no parts that will become disassembled and is controlled by pressure exerted upon the seat or the opening of the switch contacts within the seat of the vehicle.

I claim:

1. A brake control system for a motor vehicle having brakes operated by a control device to provide normal braking action, said brake control system providing emergency braking action when the driver of the vehicle leaves a resilient seat cushion of a driver's seat of the vehicle, said system including in combination a conduit system associated with brakes of the vehicle, means including electrical control means providing a certain fluid pressure in at least a portion of said conduit system which is effective to keep said brakes off, circuit means including a power supply for controlling the energization of said electrical control means, and switching means incorporated within said seat cushion for making and breaking said circuit means, said switching means including a resilient compressible insulating separator having a plurality of apertures therein spaced to cover a substantial area of said seat, a pair of foraminous flexible metallic sheets on opposite sides of said separator, said sheets each having a plurality of point contacts thereon electrically common with each other and connected electrically to said circuit means, said contacts on each said sheet being aligned with said apertures, so that when the driver sits on said seat said separator is compressed and pairs of said contacts close through said apertures to make said circuit means thereby energizing said electrical control means to keep said brakes off, and when the driver leaves said seat said separator expands to open said contacts to break said circuit means thereby deenergizing said electrical control means to change the fluid pressure in said conduit system and thereby apply said brakes, and envelope means enclosing said sheets and separator having apertures therein for breathing purposes to allow operation of said contacts.

2. The brake control system as claimed in claim 1 in which said means providing fluid pressure in said conduit system includes a source of air under pressure greater than said certain pressure blocked by said electrical control means when energized, the deenergizing of said electrical control means when said driver leaves said seat admitting air from said source to said portion of said conduit system to produce a pressure greater than said certain pressure therein which is effective to apply said brakes.

3. The brake control system as claimed in claim 1 in which said means providing fluid pressure in said conduit system includes a source of pressure less than said certain pressure blocked by said electrical control means when energized, the deenergizing of said electrical control means when said driver leaves said seat connecting said portion of said conduit system to said source to produce a pressure therein less than said certain pressure which is effective to apply said brakes.

4. The brake control system as claimed in claim 1 in which said fluid in said conduit system is air and said means producing fluid pressure in said conduit system includes a source of air under pressure greater than atmospheric pressure, said electrical control means being in one position when energized to admit air from said source to said portion of said conduit system to provide a pressure greater than atmospheric pressure therein to keep said brakes off, said brakes being spring brakes held off by said greater than atmospheric pressure, and said electrical control means being shifted to another position by the deenergization thereof to exhaust said portion of said conduit system to the atmosphere so that said spring brakes are applied.

5. The brake control system as claimed in claim 1 in which said electrical control means comprises an electrically operated valve connected in said conduit system to control the flow of fluid therein and electrically connected by said circuit means to said contacts to be actuated in response to closing and opening of said contacts.

6. The brake control system as claimed in claim 5 in which said means providing fluid pressure in said conduit system includes a source of air under pressure blocked by said valve when energized, the deenergizing of said valve admitting air from said source to said portion of said conduit system to apply said brakes, a pressure regulator controlling the level of pressure in said conduit system to provide safe braking action, and a check valve cooperating with said control device and said valve to prevent interference between the same.

7. The brake control system as claimed in claim 1 in which said metallic sheets are comprised of wire mesh and said contacts are affixed directly to said mesh.

8. The brake control system as claimed in claim 7 in which said switching means further includes insulating flexible sheets covering the outer sides of said metallic sheets, and an insulating flexible envelope enclosing said separator, said metallic sheets and said insulating sheets, said apertures being formed in said envelope.

9. The brake control system as claimed in claim 8 in which said separator and said insulating sheets are comprised of foam rubber.

10. A brake control system for a motor vehicle having brakes operated by a control device to provide normal braking action, said brake control system providing emergency braking action when the driver of the vehicle leaves a resilient seat cushion of a driver's seat of the vehicle, said brake control system including in combination a source of air under pressure, conduit means connecting said source with brakes of the vehicle, said control device being connected in a first portion of said conduit system, an electrically operated valve connected in a second portion of said conduit system, a shuttle check valve connected in said conduit system between said control device and said valve for preventing interference between the same, a pressure regulator in said second portion of said conduit system for regulating pressure therein to provide safe emergency braking, circuit means including a power supply for controlling the energization of said electrically operated valve, and switching means incorporated within said seat cushion for making and breaking said circuit means, said switching means including a resilient compressible insulating separator having a plurality of apertures therein spaced to cover a substantial area of said seat, a pair of foraminous flexible metallic sheets on opposite sides of said separator, said sheets each having a plurality of point contacts thereon electrically common with each other and connected electrically to said circuit means, said contacts on each said sheet being aligned with said apertures, so that when the driver sits on said seat said separator is compressed and pairs of said contacts close through said apertures to make said circuit means thereby energizing said electrically operated valve to keep said brakes off, and when the driver leaves said seat said separator expands to open said contacts to break said circuit means thereby deenergizing said electrically operated valve to change the fluid pressure in said conduit system and thereby apply said brakes, and envelope means enclosing said sheets and separator having apertures therein for breathing purposes to allow operation of said contacts.

References Cited

UNITED STATES PATENTS

| | | | |
|---|---|---|---|
| 1,776,992 | 9/1930 | Brockman | 200—86 |
| 2,523,846 | 9/1950 | Russell | 303—19 XR |
| 3,177,481 | 4/1965 | Joy et al. | |
| 3,177,967 | 4/1965 | Wilson | 180—82 |
| 3,305,724 | 2/1967 | Shaheen | 180—82 |
| 3,332,522 | 7/1967 | Dence | 188—109 |

FOREIGN PATENTS 686,301    5/1964    Canada.

MILTON BUCHLER, Primary Examiner

J. J. McLAUGHLIN, Jr., Assistant Examiner

U.S. Cl. X.R.

180—101; 188—109; 200—85, 86; 303—14, 15